United States Patent [19]

Abilock et al.

[11] 3,786,265

[45] Jan. 15, 1974

[54] APPARATUS FOR DETECTING DEFECTS IN CONTINUOUS TRAVELING MATERIAL

[75] Inventors: Solomon Abilock, Brooklyn; Richard Shottenfeld, Jamaica, both of N.Y.

[73] Assignee: Lindly & Company, Inc., Mineola, N.Y.

[22] Filed: Feb. 2, 1973

[21] Appl. No.: 329,209

[52] U.S. Cl............ 250/219 DF, 250/209, 356/238
[51] Int. Cl. ......................................... G01n 21/32
[58] Field of Search ................. 250/219 DF, 219 S, 250/219 WE, 209; 356/159, 160, 167, 199, 200, 237-239; 28/51

[56] References Cited
UNITED STATES PATENTS

| | | | |
|---|---|---|---|
| 3,274,882 | 9/1966 | Krieger et al................. | 250/219 DF |
| 3,409,779 | 11/1968 | Fertig.......................... | 250/219 WE |
| 3,411,008 | 11/1968 | Coombes et al.............. | 250/219 DF |
| 3,428,817 | 2/1969 | Hofmeister et al. ........... | 356/160 X |
| 3,447,213 | 6/1969 | Dost et al........................ | 250/219 S |
| 3,683,193 | 8/1972 | Weimer.............................. | 250/209 |
| 3,619,578 | 11/1971 | George......................... | 250/219 DF |
| 3,717,771 | 2/1973 | Abilock et al................ | 250/219 DF |

Primary Examiner—Walter Stolwein
Attorney—Robert E. Burns et al.

[57] ABSTRACT

Apparatus for detecting defects in continuous traveling material comprises two photoelectric detecting units disposed on the path of travel of the material with one unit downstream of the other, and a coordinating circuit between the two units. A signal produced by the upstream unit upon detection of an apparent defect is delayed or stored by a shift register for a period of time required for a defect in the material to travel from one detecting unit to the other. Coincidence of an output signal of the shift register with an output signal of the downstream detecting unit indicates the presence of an actual defect in the material. A defect signal thereupon produced can be used as desired. For example it can be used to stop the material and can be fed to a counter to provide a record of defects occurring in the material.

13 Claims, 7 Drawing Figures

APPARATUS FOR DETECTING DEFECTS IN CONTINUOUS TRAVELING MATERIAL

FIELD OF THE INVENTION

The present invention relates to apparatus for detecting defects in continuous traveling material such as yarn, fabric, magnetic tape, ribbon, cord, wire, paper, metal strips and other continuous material. Apparatus of this kind is disclosed in application Ser. No. 130,700 filed Apr. 2, 1971 and now U.S. Pat. No. 3,717,771 For convenience of explanation and without intending to limit the applicability of the invention, reference is herein made to the inspection of a sheet of yarn, for example in conjunction with a warper.

BACKGROUND OF THE INVENTION

Yarn inspectors are well known for detecting defects in a sheet of yarn while it is moving. Such yarn inspectors may comprise guide bars over which the yarns run to flatten the yarn sheet, a light source at one side of the sheet for directing a beam of light across the sheet, a photo-detecting head at the opposite side of the sheet in line with the light beam and circuitry for producing a signal when the light received by the detecting head varies a predetermined amount, for example by reason of a defect in one of the yarns of the sheet. The signal thus produced is used as desired, for example to count the defects and to stop the warper or other equipment with which the yarn inspector is used.

In the use of such inspecting equipment, difficulty is encountered by reason of false stops which occur when there is actually no defect. The sensitivity of inspection is limited by "noise" which is not inherent in the electronic system itself but is random and due to external causes, e.g. to surface irregularities or non-uniform motion of the yarn. Sensitivity settings anywhere near the noise level will usually result in falsely triggering the machine due to occasional noise peaks which exceed the general average level of the noise signal itself. In the case of photoelectric inspection of synthetic continuous filament yarn, such as nylon, the most objectionable cause of random noise is "jumping" yarn due to "plucking" in the yarn supply package, poorly wound supply packages and faulty tension devices. However, random noise can also result from electrical interference in the form of spurious signals due, for example, to high voltage spark discharges from nearby static-eliminating devices, radio frequency pick-up, static generated by yarn friction and severe power line fluctuation. False signals can also be caused by random reflections from a jumping yarn, yarn twist and reflection of light from adjacent equipment. Obviously, the occurrence of false signals is undesirable since it results in incorrect defect counts and a false stopping of the machine or process which not only reduces efficiency and total production but may in itself cause defects.

A present trend to increase the quality of materials requires greater and greater sensitivity of inspecting equipment. This increase in sensitivity unavoidably results in an increase in susceptibility of the inspecting equipment to false signals.

In the above mentioned application Ser. No. 130,700, there is disclosed an inspecting system which is highly sensitive and yet is virtually immune to actuation of anything other than actual defects. The inspecting system disclosed in that application comprises two detecting units, one disposed upstream of the other along the path of travel of the material. The two units are interconnected by a coordinating circuit which disables the downstream unit except for a short period after an apparent defect has been detected by the upstream unit. The period during which the downstream unit is enabled to function begins just before a defect detected by the upstream unit would have time to reach the downstream unit and ends shortly after such defect would have time to pass the downstream unit. If there is an actual defect, it will be detected sequentially by both units, whereupon an output signal will be produced by the downstream unit. If, on the other hand, actuation of the upstream unit has been caused by random noise, it is unlikely that the noise will recur as a signal applied to the downstream inspecting unit during the short period of time that the downstream inspecting unit is subsequently enabled by reason of the false signal of the upstream unit. Hence, the downstream unit will produce no output signal. Since the downstream unit is normally disabled, the likelihood of its being triggered by anything other than an actual defect is greatly reduced.

SUMMARY OF THE INVENTION

It is an object of the present invention to provide apparatus for detecting defects in continuous traveling material, for example a yarn sheet, comprising first detecting means located on the path of travel of the material for detecting an apparent defect in the material as it passes the first detecting means, second detecting means located on the path of travel of the material a selected distance downstream of the first detecting means for detecting a defect as it passes the second detecting means, each of the detecting means including means for producing a defect signal upon detecting an apparent defect in the material, delay means receiving a defect signal from the first detecting means and means receiving delayed signals from the delay means and defect signals from the downstream detecting means and producing an output signal when the signals of the delay means and the downstream detecting means are coincident. The delay means comprises a series of signal storage units, means for receiving in a first storage unit of the series an input signal from the upstream detecting means, means for sequentially shifting a signal to succeeding units and means for providing an output from at least one of the succeeding units of the series. The resulting delay between the input of a signal into the first unit of the series and the output from a succeeding unit corresponds to the time required for travel of a defect in the material from the upstream detecting means to the downstream detecting means. Hence, if there is an actual defect in the material, the signal from the upstream detecting unit delayed by the delay means will coincide with a signal produced by the same defect in the downstream detecting unit. On the other hand, if a signal is produced in the upstream detecting unit by something other than an actual defect, for example a jumping yarn, the possibility of the downstream unit producing a signal coincident with the delayed signal of the upstream unit is extremely remote. Hence, the apparatus provides a reliable indication of actual defects.

In preferred embodiment of the invention shown by way of example in the present application, the delay means comprises a shift register having a plurality of stages, means for feeding an input signal from the upstream detecting means to a first stage of the shift register, means for applying shift signals to the shift register to shift the input signal sequentially to successive stages and means to deliver an output signal from at least one later stage. The means for applying shift signals to the shift register is disclosed as a pulse generator operating in timed relation with the travel of the material so that each pulse represents a selected increment of travel. Thus, by selecting a shift register having a number of stages corresponding to the distance between the two detecting units, it is possible to obtain close coincidence between the delayed signal produced by a defect in the upstream unit and a signal produced by the same defect in the downstream unit. Preferably the delayed signal is expanded so that the output signal of the shift register has a duration longer than the input signal. This provides a factor of safety assuring coincidence of the signals. The expanding of the signal is readily accomplished by taking outputs from two or more successive stages of the shift register. For example, if the two detecting units are eighteen inches apart along the path of travel of the material and the pulse generator produces a pulse for each inch of travel of the material, outputs can be taken from the 17th, 18th and 19th stages of the shift register.

An advantage of the apparatus in accordance with the invention is that it can process successive defects in the material even if they are closer together than the two detecting units. The signals produced in the upstream unit by the successive defects are processed through the shift register one after the other and each produces a signal at the output stage or stages of the shift register.

BRIEF DESCRIPTION OF DRAWINGS

The major objects and advantages of inspecting apparatus in accordance with the present invention will be more fully understood from the following description in conjunction with the accompanying drawings which illustrate by way of example and without limitation a preferred embodiment of the apparatus.

In the drawings.

DESCRIPTION OF PREFERRED EMBODIMENT

Figure 1:
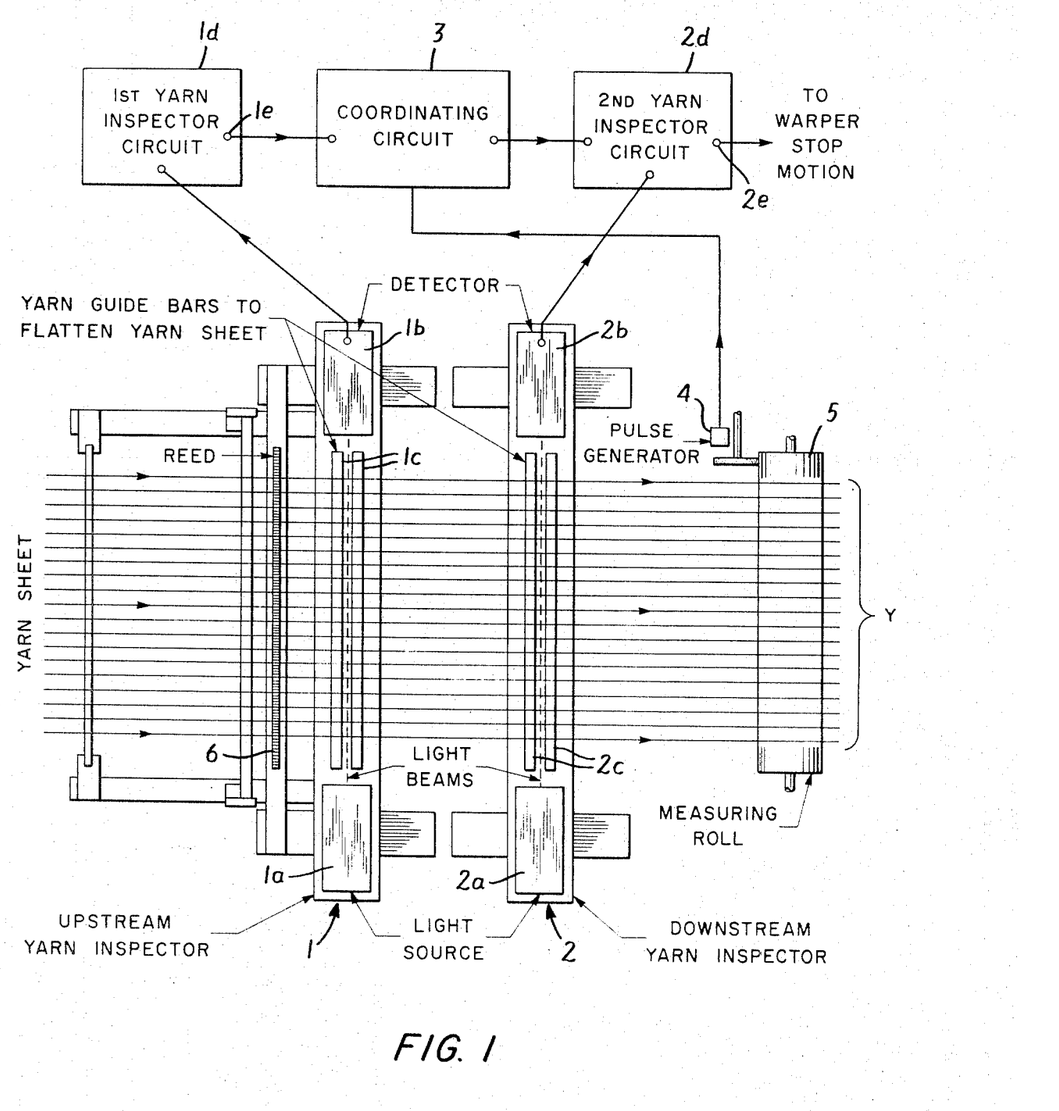
FIG. 1 is a schematic diagram of inspecting apparatus in accordance with the invention for inspecting a yarn sheet in conjunction with a warper. The system is shown as comprising two inspecting units connected with a coordinating circuit.

The apparatus shown by way of example in FIG. 1 is designed for inspecting a sheet of yarn and is illustrated as being used in conjunction with a warper. The apparatus is shown as comprising two inspecting units 1 and 2 disposed in sequence along the path of travel of the yarn sheet and spaced a selected distance from one another. With reference to the direction of travel of the yarn sheet Y as indicated by arrows in FIG. 1, the inspecting unit 1 is referred to as the upstream inspecting unit while unit 2 is referred to as the downstream inspecting unit.

The upstream inspecting unit 1 comprises a light source 1a located at one side edge of the yarn sheet and designed to transmit a light beam across the sheet. A photodetector 1b is located at the opposite side edge of the yarn sheet in position to receive the light beam transmitted by the light source 1a. Guide bars 1c located just upstream and just downstream of the light beam keep the yarn sheet flat and positioned in the beam so as to intercept a portion of the light that would otherwise fall on the light sensitive element of the photo-detector 1b. A reed 6 located upsteam of the guide bars keeps individual yarns properly positioned laterally. Any defects in the yarn such as nodes, fluff balls or other irregularities cause a variation in the amount of light intercepted and hence a variation in the light received by the photo-detector 1b, thereby producing a signal. An electrical circuit 1d includes circuitry for controlling the light source 1a and for amplifying and processing signals received from the photo-detector 1b so as to produce a defect signal at an output terminal 1e when a signal of predetermined characteristics is received from the photo-detector.

The downstream inspecting unit 2 similarly comprises a light source 2a, a photo-detector 2b, guide bars 2c and circuitry 2d having an output terminal 2e. The two inspecting units 1 and 2 may be constructed as a single assembly with common supporting means or as two separate units. In either event the units are so mounted that their light beams are parallel to one another and are a selected fixed distance apart. The two inspecting units may, if desired, be of like construction and characteristics. Alternatively, the upstream inspecting unit 1 may be of relatively simple design while the downstream inspecting unit 2 may be more sophisticated so as to detect, for example, different magnitudes of defects, the length of defects and the number of defects per unit length as disclosed, for example, in our application Ser. No. 80,664.

The two inspecting units are interconnected by a coordinating circuit 3 by means of which a signal produced by the upstream unit upon detection of an apparent defect in the material is retarded or delayed for a period of time corresponding to the time required for a defect in the material to travel from one detecting unit to the other. Coincidence of the delayed signal of the upstream yarn inspecting unit with a defect signal produced by the downstream detecting unit indicates the presence of an actual defect in the material. An output signal thereupon produced can be used as desired. For example, it can be used to stop the material and actuate signal means, either visual or audible or both, and it can also be fed to a counter so as to provide a record of defects occurring in the material. The coordinating circuit 3 is connected to the circuit 1d of the upstream yarn inspector so as to receive an input signal whenever a real or apparent defect is detected by the upsteam unit. It is connected with the circuit 2d of the downstream inspecting unit 2 in such manner that an output signal is produced when the delayed signal from the upstream inspecting unit is coincident with the detection of a defect by the downstream unit. For example, circuitry for producing an output signal may be included in the circuit 2d of the downstream yarn inspector in which event an output of the coordinating circuit is connected to the downstream yarn inspector circuit 2d as illustrated in FIG. 1 so as to "enable" the downstream yarn inspector to produce a signal output only during a short interval when a delayed signal from the upstream yarn inspector is fed to the downstream yarn inspector circuit by the coordinating circuit 3. Suitable means for enabling the downstream yarn inspector is illustrated by way of example in the above mentioned application Ser. No. 130,700. Alternatively, circuitry for determining coincidence between a delayed signal from the upstream yarn inspector and detection of a defect by the downstream yarn inspector, instead of being included in the downstream yarn inspector circuit, may be considered as a separate component to which both the coordinating circuit and the downstream yarn inspector are connected. Thus, as shown for example in FIG. 7, outputs of the coordinating and the downstream yarn inspector may be connected to the input terminals of an AND gate 7 which provides a defect signal output at its output terminal only when signals are received coincidentally from the coordinating circuit and the downstream yarn inspector. In either event the downstream yarn inspector is enabled or gated so as to produce an output signal only when a signal from the upstream yarn inspector suitably delayed by the coordinating circuit coincides with the detection of a defect by the downstream yarn inspector. The output signal is used as desired, for example to stop the material being inspected and to operate a visual or audible signal. Moreover, it may be fed to a counter so that the number of defects occurring in the material may be recorded.

Figure 2:
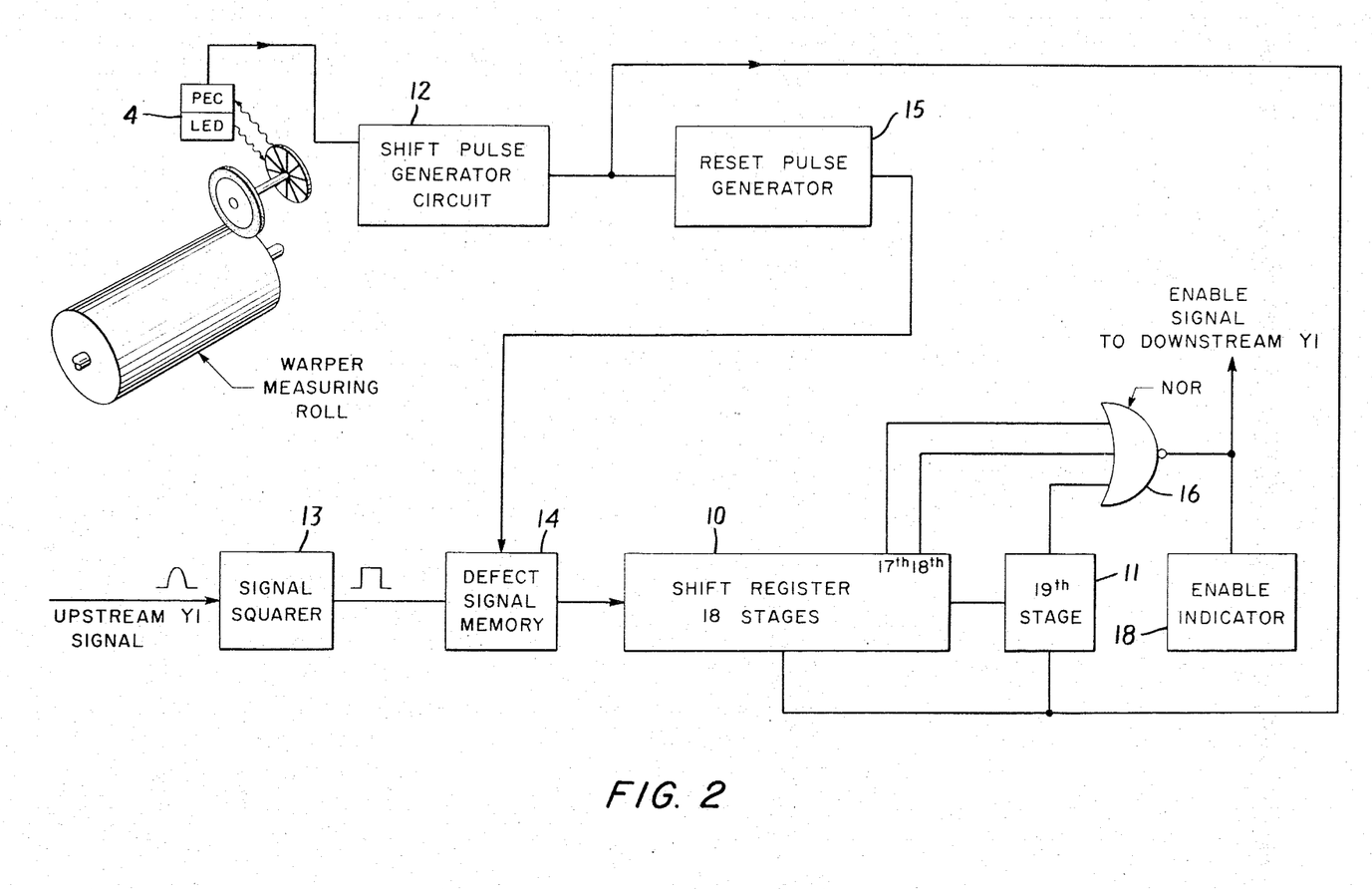
FIG. 2 is a block diagram of circuitry of the apparatus shown in FIG. 1 in combination with a schematic illustration of mechanical portions of a pulse generator forming a part of the apparatus.

The circuitry of the apparatus as shown by way of example in FIG. 2 comprises a shift register 10 for delaying the signal from the upstream yarn inspector and an auxiliary shift register unit 11 for increasing the number of stages available. Clock or shift pulses for shifting or advancing the signals or data in the shift register from one stage to the next are supplied by a shift pulse generator circuit 12 which receives pulses from a pulse generator 4 which is operated in timed relation with the travel of the material being inspected so that the delay provided by the shift register is coordinated with the distance between the two inspector units and the rate of travel of the material so that the signal of the upstream inspector unit is delayed for a period equal to that required for a defect in the material to travel from one inspector unit to the other irrespective of the speed of travel. A signal from the upstream yarn inspector is fed to the first stage of the shift register 10 through a signal shaper 13 and a storage or memory unit 14. A pulse for resetting the signal memory 14 after a signal has been transferred to the shift register is supplied by a reset pulse generator 15 which is operated from the shift pulse generator circuit 12. Selected output terminals of the shift register are connected to the inputs of a NOR gate 16, the output terminal of which is connected to an indicator 17 and also to the enable circuit of the downstream yarn inspector.

Figure 3:
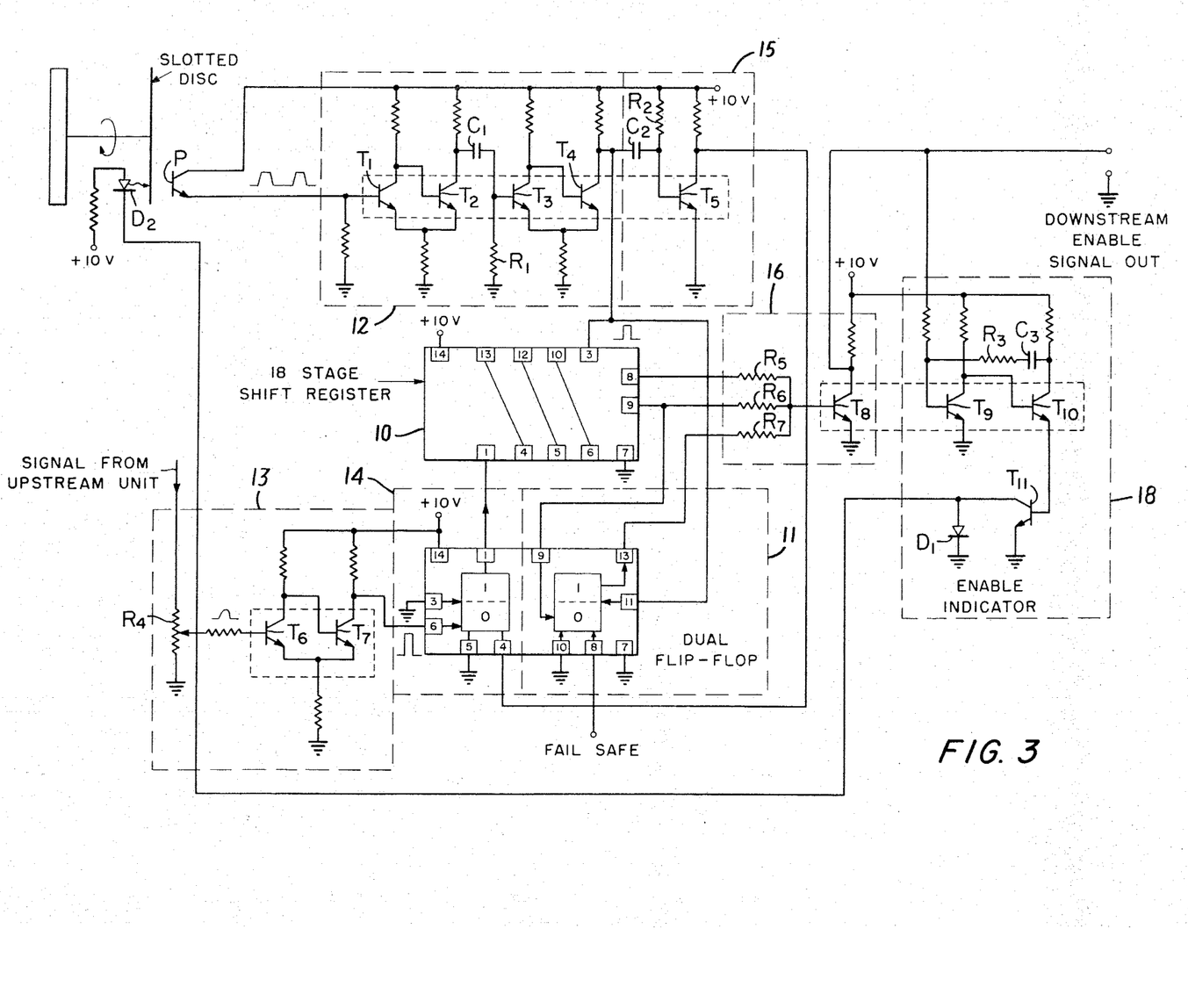
FIG. 3 is a circuit diagram showing in more detail the circuitry of the coordinating circuit and its connections with circuitry of the two inspecting units.

The circuitry is shown in more detail in FIG. 3. In order to obtain the number of stages desired for the particular apparatus illustrated by way of example in the drawings while at the same time utilizing commercially available components, the shift register is shown as comprising a main unit 10 and an auxiliary unit 11. The main shift register 10 is shown as having eighteen stages and may for example be an integrated circuit such as RCA Static Shift Register CD4006A. Only terminals numbered 1, 3 to 10 and 12 to 13 are illustrated in the drawings. A common clock or shift signal is used for all of the stages. Data is shifted from one stage to the next on the negative going transistion of the shift signal. The data input for the shift register is connected to terminal 1. Shift signals are supplied to terminal 3. Outputs from the 17th and 18th stages are taken from terminals 8 and 9 respectively which are connected to two input terminals of a NOR gate 16.

The auxiliary shift register unit 11 is shown as comprising a bistable flip-flop serving as the 19th stage of the shift register. It may, for example comprise one-half of a dual "D"-type flip-flop such as RCA Integrated Circuit CD4013A. Only terminals 7 to 11 and 13 are shown. The clock or shift terminal 11 is connected to the output of the shift pulse generator circuit 12. The input terminal 9 is connected to the output terminal 9 of the 18th stage of the shift register 10. The output terminal 13 is connected to a third input of the NOR gate 16. The logic level present at the input is transferred to the output during the positive going transistion of the shift pulse received from the shift pulse generator circuit 12. This assures that data is transferred from the 18th stage of the shift register 10 to the 19th stage 11 before it is shifted out of the 18th stage by the negative going transistion of the shift pulse, which has an approximately rectangular positive going wave form.

With reference to FIGS. 1 to 5, the pulse generator 4 for supplying pulses to the shift pulse generator circuit 12 of the shift register is shown as comprising a light emitting diode D2 and a photo-resistor P disposed on opposite sides of an opaque disc 20 having a plurality of uniformly spaced radially extending slots 20a. The disc 20 is mounted on a shaft 21 which is rotatably supported by spaced bearing supports 22. The light emitting diode and photoelectric cell are mounted in spaced arms of a plastic mount 23 carried by the same support member and are disposed on opposite sides of the disc 20 so that light is intermittently transmitted from the light emitting diode to the photoelectric cell through the slots 20a of the rotating disc 20. Alternatively, the light emitting diode and photoelectric cell can be mounted on the same side of the disc 20 which in this event is provided with alternate reflective and non-reflective portions that light from the diode is periodically transmitted by reflection to the photoelectric cell as the disc rotates. The disc 20 is rotated in timed relation with the travel of the material being inspected. For example, it may be connected by suitable gearing or belting to a driven member of the warper or other equipment with which the inspecting apparatus is used. In the embodiment illustrated in the drawings the disc 20 is driven by a rubber tired wheel 24 which is fixed on one end of the shaft 21 and engages the periphery of a measuring roll 5 over which the yarn sheet being inspected runs. By reason of the timed relationship between rotation of the disc 20 and the travel of the material being inspected, the spacing between successive pulses generated by the pulse generator corresponds to a predetermined increment of travel of the material.

Figures 4, 5:
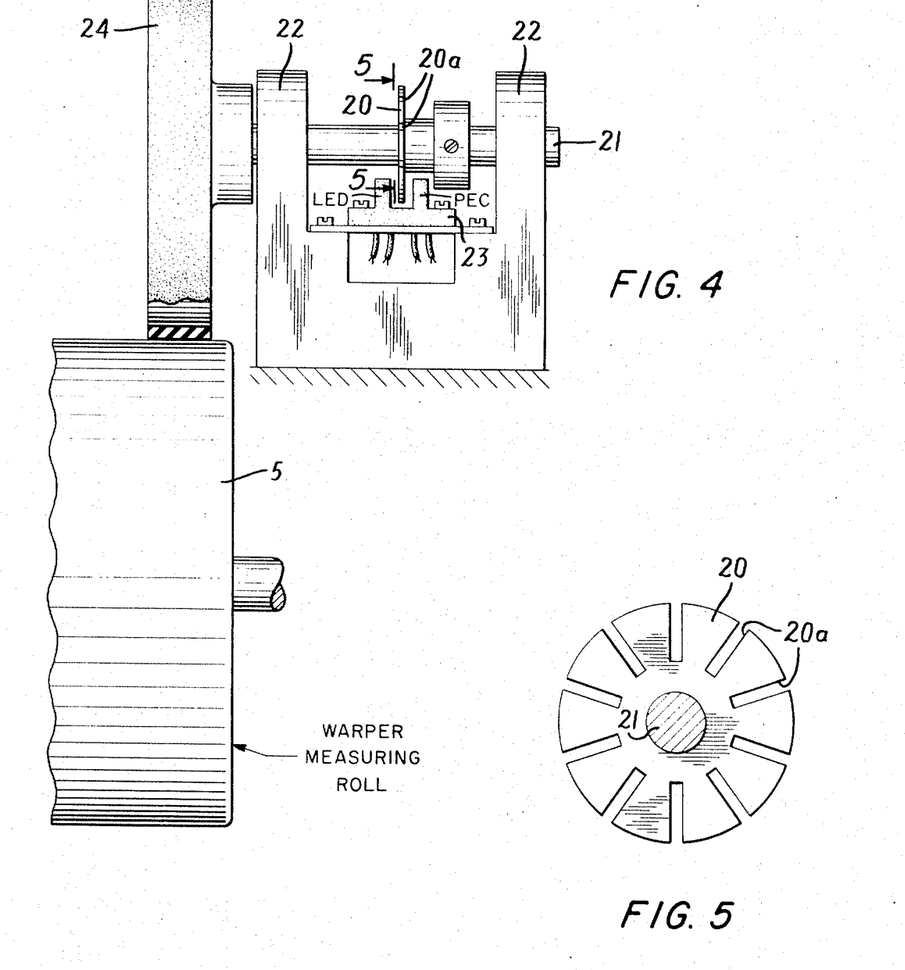
FIG. 4 is a more detailed view of portions of the pulse generator illustrated schematically in FIGS. 1, 2 and 3.
FIG. 5 is an enlarged view of a slotted disc forming part of the pulse generator illustrated in FIG. 4 taken approximately on the line 5—5 in FIG. 4.

For example, if the disc 20 is provided with ten slots as illustrated, and makes one revolution for each 10 inches of travel of the material, each pulse will represent a travel of one inch.

Pulses generated by the pulse generator 4 are fed to the input terminal of the shift pulse generator circuit 12. This circuit is shown as comprising transistors T1 and T2 which comprise a Schmitt trigger which shapes the pulse received from the pulse generator 4 so as to produce a positive going rectangular wave form with a selected voltage value. The capacitor C1 and resistor R1 comprise a differentiating circuit with a time constant of selected value to provide a differentiated pulse which is fed to the input of a second Schmitt trigger comprising transistors T3 and T4 which serves to square up the differentiated pulse to provide an approximately rectangular positive going pulse having a wave form as illustrated by way of example by the curve W1 in FIG. 6. The output terminal of the shift pulse generator circuit 12 is connected, as described above, to the shift terminal 3 of the shift register 10 and also to the shift terminal 11 of the flip-flop 11 constituting the 19th stage of the shift register.

The signal shaper 13 is shown as comprising transistors T6 and T7 constituting a Schmitt trigger which amplifies and squares a defect signal received from the upstream detecting unit through a voltage divider R4 which serves as a sensitivity control for setting the triggering threshold of the signal shaper 13 at a voltage slightly lower than that required to trigger the upstream detecting unit. This insures that every real or apparent defect detected by the upstream detecting unit will trigger the signal shaper and thus will enter and be accepted for processing by the coordinating circuit. The function of the signal shaper 13 is to convert each output signal of the upstream detecting unit which exceeds a selected voltage level into a rectangular wave form of substantially constant peak-to-peak amplitude that exceeds the triggering level of the memory circuit 14. The resulting rectangular positive going signal is fed to the input of the signal memory 14 comprising the other half of the dual flip-flop of the 19th shift register stage 11. The collector of the transistor T7 is shown connected to the set terminal 6 of the memory flip-flop 14. An output terminal 1 of the memory flip-flop is connected to the input terminal 1 of the first stage of the shift register 10. The reason for the memory unit 14 is that data can be introduced into the shift register only upon the occurrence of a shift signal from the shift pulse generator circuit 12. It is hence necessary to store and thereby preserve the signal from the upstream detecting unit until the next succeeding shift pulse is supplied to the shift register 10 by the shift pulse generator circuit 12. The memory unit 14 is thereafter reset to its original condition by a ulse from the reset pulse generator 15 which comprises an amplifying transistor T5 having a collector connected to the reset terminal 4 of the memory flip-flop 14 and a base connected to the output of the shift pulse generator circuit 12 by a differentiating circuit C2, R2 having a time constant to provide a differentiated pulse of selected length. As the transistor T5 is normally held in conduction by the resistor R2, only the negative going part of the differentiated pulse corresponding to the trailing edge of the shift pulse produces a pulse at the collector. Thus the reset pulse begins after the end of the shift pulse.

Figure 6:
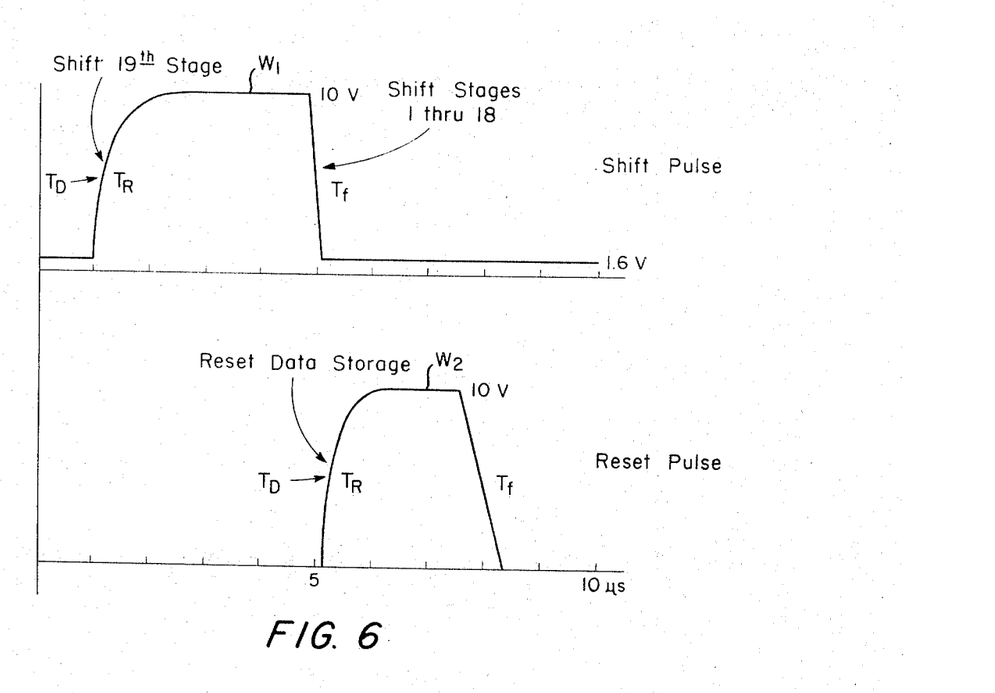
FIG. 6 is a time chart illustrating time relationships in circuit operation as described below.

The time relationship between the shift pulse and the reset pulse is illustrated by way of example in FIG. 6 where the curve W1 represents the shift pulse produced by the shift pulse generator circuit 12 and the curve W2 represents the reset pulse produced by the reset pulse generator 15. The negative going transistion of the shift pulse W1 effects the shift of data from one stage to the next in the shifts register 10 comprising the first eighteen stages while the positive going transistion effects the shift of the nineteenth stage 11. Hence, as described above, there is provided a safety factor assuring that data is received by the 19th stage before it is shifted out of the 18th stage of the shift register. The positive going transition of the reset pulse represented by curve W2 is slightly later than the negative going transistion of the shift pulse W1, for example by a fraction of a microsecond, to assure that data is transferred from the storage unit 14 to the first state of the shift register 10 before the storage unit is cleared by a reset pulse.

The NOR gate 16 is shown as comprising three resistances R5, R6 and R7 connected respectively to the three input terminals and a transistor T8, the base of which is connected to the resistances. The collector of the transistor T8 is connected to the output terminal of the NOR gate which constitutes the output of the delay circuit comprising the shift register. It is this output terminal which is shown in FIG. 1 as being connected to the downstream yarn inspector so as to supply an enabling signal for a very short interval of time. If, during this interval the downstream yarn inspector detects a defect, an output signal is produced to stop the travel of the material or perform such other functions as are desired.

The outputs of the NOR gate 16 is also shown connected to an enable indicator 18 to provide a visual indication that a real or apparent defect has been detected by the upstream inspecting unit. The enable indicator comprises a light emitting diode D1 which is normally illuminated by current supplied from a 10 volt source which also supplies current in series to the light emitting diode D2 of the shift pulse generator 4. Transistors T9 and T10 constitute a one shot multivibrator, the purpose of which is to elongate the enabling pulse so that a signal produced will be sufficiently long to be capable of being observed. The emitter of the transistor T10 is connected to the base of a transistor T11 which shorts out the diode D1 when the transistor is conducting. In the absence of a signal from the NOR gate 16, the transistor T9 is conducting while transistors T10 and T11 are non-conducting and hence the diode D1 is illuminated. When an enabling signal is received from the NOR gate 16, the transistor T9 becomes non-conducting and transistors T10 and T11 become conducting. The transistor T11 thereby shorts out the diode D1 so that the diode is extinguished while the series connected diode D2 remains illuminated. By being normally illuminated the diode D1 provides an indication that the system is functioning normally while momentary extinguishing of the diode indicates that a defect has been detected by the upstream yarn inspector. If the signal received by the indicator circuit is short, for example 4 milliseconds, the period during which diode D1 is extinguished is too short to be visually observed. However, by reason of the time constant of the circuit comprising the resistor R3 and capacitor C3 the signal is stretched for example to 250 milliseconds so that it can be readily observed.

The operation of the apparatus will be readily understood from the foregoing description. When a defect, whether real or apparent, is detected by the upstream yarn inspector 1, a defect signal is transmitted through the signal shaper 13 which squares up the signal and transmits it to the signal memory unit 14 where it is stored until occurrence of the next succeeding shift pulse provided by the shift pulse generator circuit 12. The signal is thereby introduced into the first stage of the shift register 10 and the memory unit 14 is thereafter cleared by a reset pulse from the reset pulse generator 15. With each succeeding pulse supplied to the shift register by the shift pulse generator 12 the signal introduced into the shift register is sequentially advanced from one stage to the next until it reaches the last or 18th stage. The next clock pulse transfers the signal to the 19th stage comprising the flip-flop 11. As the outputs of the 17th, 18th and 19th stages are connected respectively to three inputs of the NOR gate 16, a signal will be produced at the output of the NOR gate throughout the time that the shift register signal is in the 17th, 18th and 19th stages. Hence, the duration of the output signal of the NOR gate is greater than that of the input signal into the shift register. This provides a factor of safety in that the downstream yarn inspector is enabled from a time slightly before a defect in the material which had been detected by the upstream yarn inspector reaches the downstream yarn inspector and continues until slightly after such defect passes the downstream yarn inspector.

As described above, the signal from the output of the NOR gate 16 not only enables the downstream yarn inspector to produce an output signal if it concurrently detects a defect but is also fed to the enable indicator circuit 18 to provide visual indication that a defect has been detected by the upstream yarn inspector.

The output signal produced upon coincidence of the delayed signal from the upstream yarn inspector and a signal of the downstream yarn inspector may be used to initiate a stop motion whereby the warper or other equipment with which the detecting apparatus is used is stopped so that the defect can be removed or remedied. When the machine is again started, the defect detecting system will operate as before. Its operation is not affected by variation in speed of the equipment during start up since the delay provided by the system depends on the length of material passing the detecting stations rather than on time. If the output signal is not used to stop the equipment but rather to provide a visual indication and a count of the defects, the system will continue to operate to process successive defects. An advantage of the system in accordance with the invention is that it can process successive defects even if they are closer together than the spacing between the two inspecting units. This results from the fact that two or more data signals can proceed one behind the other through the successive stages of the shift register at the same time. Likewise, an input signal which has a duration longer than the time intervals between successive shift pulses can be processed through the shift register to produce a correspondingly longer signal at the output of the NOR gate 16.

Figure 7:
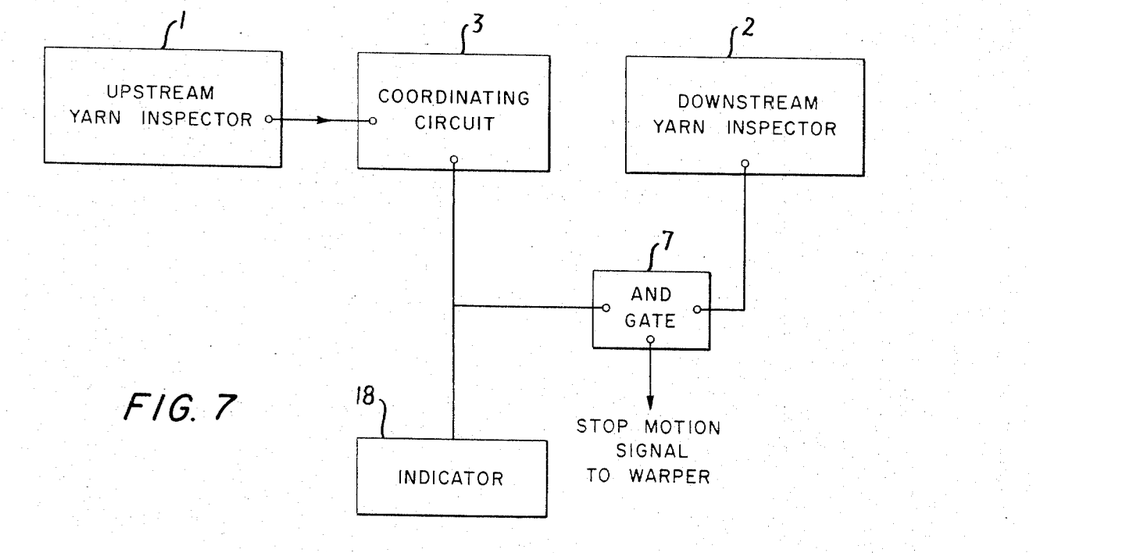
FIG. 7 is a block diagram illustrating a variation of apparatus in accordance with the invention.

As indicated above, an enabling signal produced by the coordinating circuit in consequence of a defect, real or apparent, having been detected by the upstream inspecting unit can be fed to gating means controlling the output of the downstream inspecting unit. This is illustrated by way of example in FIG. 7 where the output of the downstream inspecting unit 2 and the output of the coordinating circuit are connected respectively to inputs of an AND gate 7 the output of which is connected to the warper stop motion or to such other device as it is desired to actuate or control. Thus, an output signal is produced only when there is coincidence between the enabling signal from the coordinating circuit and a signal from the downstream yarn inspector. The output terminal of the coordinating circuit shown in FIG. 3 corresponds to the output of the NOR gate 16 shown in FIGS. 2 and 3. In FIG. 7 there is also shown an indicator 18 which may be the same as the indicator illustrated in FIG. 3. Instead of being connected to the output of the coordinating circuit 3 the indicator may, if desired, be connected to the output of the AND gate 7. In this case, however, an indication will be provided only when there is coincidence between an enabling signal and a signal from the downstream inspecting unit 2.

While a preferred embodiment and a variation thereof have been shown by way of example in the drawings and are herein particularly described, it will be understood that the invention is not limited to this embodiment. Thus, the several components herein illustrated and described may be replaced by other suitable components operating in like or similar manner to obtain like results as is well known in the art.

What we claim and desire to secure by Letters Patent is:

1. Apparatus for detecting defects in continuous traveling material comprising first detecting means located on the path of travel of said material for detecting an apparent defect in said material as it passes said first detecting means, second detecting means located on the path of travel of said material a selected distance downstream of said first detecting means for detecting a defect as it passes said second detecting means, each of said detecting means including means for producing an output signal upon detecting an apparent defect in said material, delay means receiving an output signal from said first detecting means and later producing an output signal, means receiving said output signals from said delay means and from said second detecting means and producing a defect signal when said output signals of the delay means and the second detecting means are coincident, said delay means comprising a series of signal storage units, means for receiving in a first storage unit of said series an input signal from said first detecting means, means for sequentially shifting a signal to succeeding units and means for providing an output from at least one of said succeeding units, the resulting delay corresponding to the time required for travel of a defect in said material from said first detecting means to said second detecting means.

2. Apparatus according to claim 1, in which said delay means comprises means for producing an output signal of longer duration than the input signal received from said first detecting means.

3. Apparatus according to claim 1, in which said delay means comprises a shift register having a plurality of stages, means for feeding an input signal from said first detecting means to a first stage of said shift register, means for applying shift signals to said shift register to shift said input signal sequentially to successive stages and means to deliver an output signal from at least one later stage.

4. Apparatus according to claim 3, in which each stage of said shift register comprises a bistable flip-flop circuit.

5. Apparatus according to claim 1, in which said means for applying shift signals comprises a pulse generator and means for driving said pulse generator in synchronism with the travel of said material.

6. Apparatus according to claim 3, in which said means for feeding an input signal to said shift register comprises means receiving an output signal from said first detecting means and storing said signal until the next following shift signal is received by said shift register.

7. Apparatus according to claim 6, comprising means for resetting said storing means a predetermined time after said next following shift signal.

8. Apparatus according to claim 3, in which said delay means includes a NOR gate receiving input signals from at least two successive stages of said shift register and producing an output signal when a signal is received from either of said successive stages, whereby said output signal of said NOR gate is longer than the input signal fed to the first stage of said shift register.

9. Apparatus according to claim 3, in which said shift register comprises integrated circuitry comprising a plurality of stages and at least one additional stage comprising a bistable flip-flop circuit connected with said integrated circuitry to operate sequentially therewith.

10. Apparatus according to claim 9, in which said means for applying clock signals comprises means providing a time differential between the shifting of said stages of said integrated circuitry and said additional stage to assure transfer of a signal between said integrated circuitry and said additional stage.

11. Apparatus according to claim 1, comprising means receiving an output signal from said delay means and producing an indicating signal of greater duration than said output signal from the delay means.

12. Apparatus according to claim 1, in which said means for producing a defect signal is associated with said second detecting means.

13. Apparatus according to claim 1, in which said means for producing a defect signal comprises an AND gate receiving signals from said delay means and said second detecting means.

* * * * *